(12) United States Patent
Zhang et al.

(10) Patent No.: US 10,439,695 B1
(45) Date of Patent: Oct. 8, 2019

(54) SYSTEMS AND METHODS FOR PERFORMING IMPLICIT SOUNDING IN MULTI-USER MULTIPLE INPUT MULTIPLE OUTPUT (MU-MIMO) SYSTEMS

(71) Applicant: Marvell International Ltd., Hamilton (BM)

(72) Inventors: Hongyuan Zhang, Fremont, CA (US); Sudhir Srinivasa, Campbell, CA (US); Christian R. Berger, San Jose, CA (US); Xiayu Zheng, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 16/014,366

(22) Filed: Jun. 21, 2018

Related U.S. Application Data

(60) Provisional application No. 62/523,168, filed on Jun. 21, 2017.

(51) Int. Cl.
| | |
|---|---|
| *H04L 5/00* | (2006.01) |
| *H04B 7/06* | (2006.01) |
| *H04B 7/0417* | (2017.01) |
| *H04B 7/0456* | (2017.01) |
| *H04B 7/0452* | (2017.01) |
| *H04L 1/16* | (2006.01) |
| *H04B 17/309* | (2015.01) |

(52) U.S. Cl.
CPC ......... *H04B 7/0617* (2013.01); *H04B 7/0421* (2013.01); *H04B 7/0452* (2013.01); *H04B 7/0456* (2013.01); *H04B 7/0626* (2013.01); *H04B 7/0639* (2013.01); *H04B 7/0656* (2013.01); *H04B 17/309* (2015.01); *H04L 1/1685* (2013.01); *H04L 5/0048* (2013.01)

(58) Field of Classification Search
USPC .................................................. 375/267, 260
See application file for complete search history.

(56) References Cited

U.S. PATENT DOCUMENTS

| | | | | |
|---|---|---|---|---|
| 2010/0254473 A1* | 10/2010 | Wu | ...................... | H04B 7/0434 375/267 |
| 2011/0135023 A1* | 6/2011 | Kwon | ................. | H04L 25/0204 375/260 |
| 2018/0343044 A1* | 11/2018 | Athley | ................. | H04B 7/0417 |

* cited by examiner

*Primary Examiner* — Eva Y Puente

(57) ABSTRACT

Embodiments described herein provide a method for performing beamforming in a multiple-user-multiple-input-multiple-output (MUMIMO) system. At a MUMIMO access point, MUMIMO data may be received from a station of a plurality of stations. Uplink channel state information may be obtained, from the MUMIMO data, representing an uplink channel between the station and the MUMIMO access point. The uplink channel includes signals transmitted from the station using the second number of antennas. Downlink channel state information may be computed, based on the uplink channel state information, representing a downlink channel between the MUMIMO access point and the station.

20 Claims, 2 Drawing Sheets

SYSTEMS AND METHODS FOR PERFORMING IMPLICIT SOUNDING IN MULTI-USER MULTIPLE INPUT MULTIPLE OUTPUT (MU-MIMO) SYSTEMS

CROSS-REFERENCE TO RELATED APPLICATION

This disclosure claims the benefit under 35 U.S.C. § 119(e) of U.S. Provisional Patent Application No. 62/523,168, filed Jun. 21, 2017, which is hereby incorporated by reference herein in its entirety.

FIELD OF USE

This disclosure relates to data transmission protocols in Institute of Electrical and Electronics Engineers (IEEE) 802.11 wireless local area networks, and specifically, to systems and methods for transmitting signals in multiuser-multiple-input-multiple-output (MUMIMO) systems.

BACKGROUND

The background description provided herein is for the purpose of generally presenting the context of the disclosure. Work of the inventors hereof, to the extent the work is described in this background section, as well as aspects of the description that does not otherwise qualify as prior art at the time of filing, are neither expressly nor impliedly admitted to be prior art against the present disclosure.

In typical MUMIMO systems, an access point applies a precoding matrix to a single downlink (DL) MUMIMO packet and transmits the data to all of the receiving stations simultaneously. In such systems, the precoding matrix is computed by the access point using an explicit sounding protocol. In particular, the access point transmits a sounding packet to multiple receiving stations in the format of a non-data packet (NDP). Each receiving station computes a channel estimate and generates a feedback matrix based on the channel estimate. The feedback matrix represents a gain and phase across all available subcarriers of each receiving antenna of the station. Each receiving station then sends its respective feedback matrix back to the access point either sequentially (in the case of 802.11ac protocol) or simultaneously using an uplink-MU packet (in the case of 802.11ax). The access point combines the feedback matrices received from each receiving station and computes the precoding matrix for use in downlink data transmissions.

In these systems, the receiving stations compute their respective feedback matrix based on the number of receiver antennas at the station and the number of transmitter antennas used by the access point for sounding. For example, if the access point transmits the NDP from 4 transmitter antennas and a station receives it with 2 receiver antennas, a 4×2 channel matrix may be calculated for each subcarrier. In some cases, the access point may have more antennas (e.g., 8 antennas) than the number of antennas supported by receiving stations (e.g., 4 antennas). When the access point has more antennas than what is supported by the receiving stations, additional beamforming phase and gain for downlink transmissions using the additional antennas cannot be determined by explicit sounding. This is because, in explicit sounding, the feedback matrices that are fed back from the receiving stations represent the channel estimate for only the antennas the respective stations support (e.g., 4 antennas) and not all the antennas (e.g., 8 antennas) of the access point. This results in the additional antennas of the access point being wasted in downlink transmissions as the access point is forced to act as a four antenna (4×4) access point rather than an eight antenna (8×8) access point.

SUMMARY

Embodiments described herein provide a method for performing beamforming in a multiple-user-multiple-input-multiple-output (MUMIMO) system. At a MUMIMO access point, MUMIMO data may be received from a station of a plurality of stations. The access point has a first number of antennas, and the station has a second number of antennas less than the first number. Uplink channel state information may be obtained, from the MUMIMO data, representing an uplink channel between the station and the MUMIMO access point. The uplink channel includes signals transmitted from the station using the second number of antennas. Downlink channel state information may be computed, based on the uplink channel state information, representing a downlink channel between the MUMIMO access point and the station. The downlink channel includes signals transmitted from the MUMIMO access point using the first number of antennas. Data may be transmitted from the MUMIMO access point to the plurality of stations using the first number of antennas based on the downlink channel state information.

In some implementations, an uplink channel state information matrix having a size corresponding to the first number of antennas of the access point may be computed, based on the uplink channel state information. A downlink channel state information matrix may be generated by transposing the uplink channel state information matrix. A precoding matrix may be computed, based on the downlink channel state information matrix, at the access point for transmitting the data to the plurality of stations.

In some implementations, the station is a first station and wherein the downlink channel state information matrix is a first downlink channel state information matrix. MUMIMO data may be received, at the MUMIMO access point, from a second station of a plurality of stations, wherein the second station has a third number of antennas less than the second number. A second uplink channel state information matrix having a size corresponding to the first number of antennas of the access point may be computed, based on uplink channel state information of the data received from the second station. A second downlink channel state information matrix may be generated by transposing the second uplink channel state information matrix. Computing the precoding matrix at the access point comprises combining the first and second downlink channel state information matrices.

In some implementations, the size of the uplink channel state information matrix is Nr×Nss, and the size of the downlink channel state information matrix is Nss×Nr, where Nr is the first number and Nss is the second number.

In some implementations, a calibration correction matrix may be retrieved from storage. The calibration correction matrix may be applied to the downlink channel state information matrix before computing the precoding matrix.

In some implementations, the calibration correction matrix may be applied to the precoding matrix.

In some implementations, a predetermined symbol of the data received by each of the antennas of the access point may be processed to generate the uplink channel state information corresponding to each of the antennas of the access point.

In some implementations, at least one of a null data packet, a junk data packet, and a Transmission Control Protocol (TCP) null data packet may be transmitted from the access point to the plurality of stations. The station may be caused to transmit at least one of Block Acknowledgement (BA/ACK) frame and a transmission control protocol (TCP) acknowledgements (ACKs) frame in response to the station receiving the at least one of the null data packet, the junk data packet, and the TCP null data packet. The downlink channel state information is computed periodically.

In some implementations, information may be communicated between the MUMIMO access point and another wireless device. A raw channel state information estimate of a downlink channel and an uplink channel of at least one of the MUMIMO access point antennas may be used in communicating the information. At least one of a phase and magnitude difference may be used between the downlink and uplink channels. A calibration matrix may be generated based on the computed at least one of a phase and magnitude difference.

In some implementations, the calibration matrix is either constant across all subcarriers of the MUMIMO access point or different for each subcarrier of the access point.

Embodiments described herein provide a system for performing beamforming in a multiple-user-multiple-input-multiple-output (MUMIMO) system. The system includes control circuitry. The control circuitry is configured to receive, at a MUMIMO MUMIMO access point, MUMIMO data from a station of a plurality of stations. The MUMIMO access point has a first number of antennas, and the station has a second number of antennas less than the first number. The control circuitry is further configured to obtain, from the data, uplink channel state information representing an uplink channel between the station and the MUMIMO access point. The uplink channel includes signals transmitted from the station using the second number of antennas. The control circuitry is further configured to compute, based on the uplink channel state information, downlink channel state information representing a downlink channel between the MUMIMO access point and the station. The downlink channel includes signals transmitted from the MUMIMO access point using the first number of antennas. The control circuitry is further configured to transmit data from the MUMIMO access point to the plurality of stations using the first number of antennas based on the downlink channel state information.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

This disclosure describes methods and systems for performing implicit sounding for generating a precoding matrix at an access point in MUMIMO systems. In particular, according to various embodiments of the disclosure, an access point with more antennas than supported by receiving stations computes a channel estimate representing a downlink communications path to the receiving stations using implicit sounding. The access point computes channel estimates based on uplink data packets received from various receiving stations that are transmitted using some or all of the antennas supported by the receiving stations (e.g., 4 antennas). The access point combines the channel estimates computed for each of the receiving stations to generate a precoding matrix for downlink transmissions using all of the antennas of the access point. The access point applies a calibration correction matrix to the channel estimates or the precoding matrix to subsequently transmit data to the receiving stations using all of the antennas (e.g., 8 antennas) supported by the access point.

Traditional systems are limited to applying precoding only to the number of antennas of an access point a given receiving station supports which results in wasted antenna resources of the access point. According to the described embodiments, by implicitly performing sounding to derive channel estimates for all of the antennas an access point has based on signals received from various receiving stations, the access point can transmit signals to multiple users in a MIMO manner using all of the antennas even when the receiving stations support less antennas than those available to the access point. In particular, rather than being limited to the channel estimates fed back from various receiving stations to the access point that represent a number of antennas a particular receiver can support, according to some embodiments, the access point uses any data packet a receiving station sends to implicitly derive the channel estimate for all of the antennas the access point supports.

Figure 1:
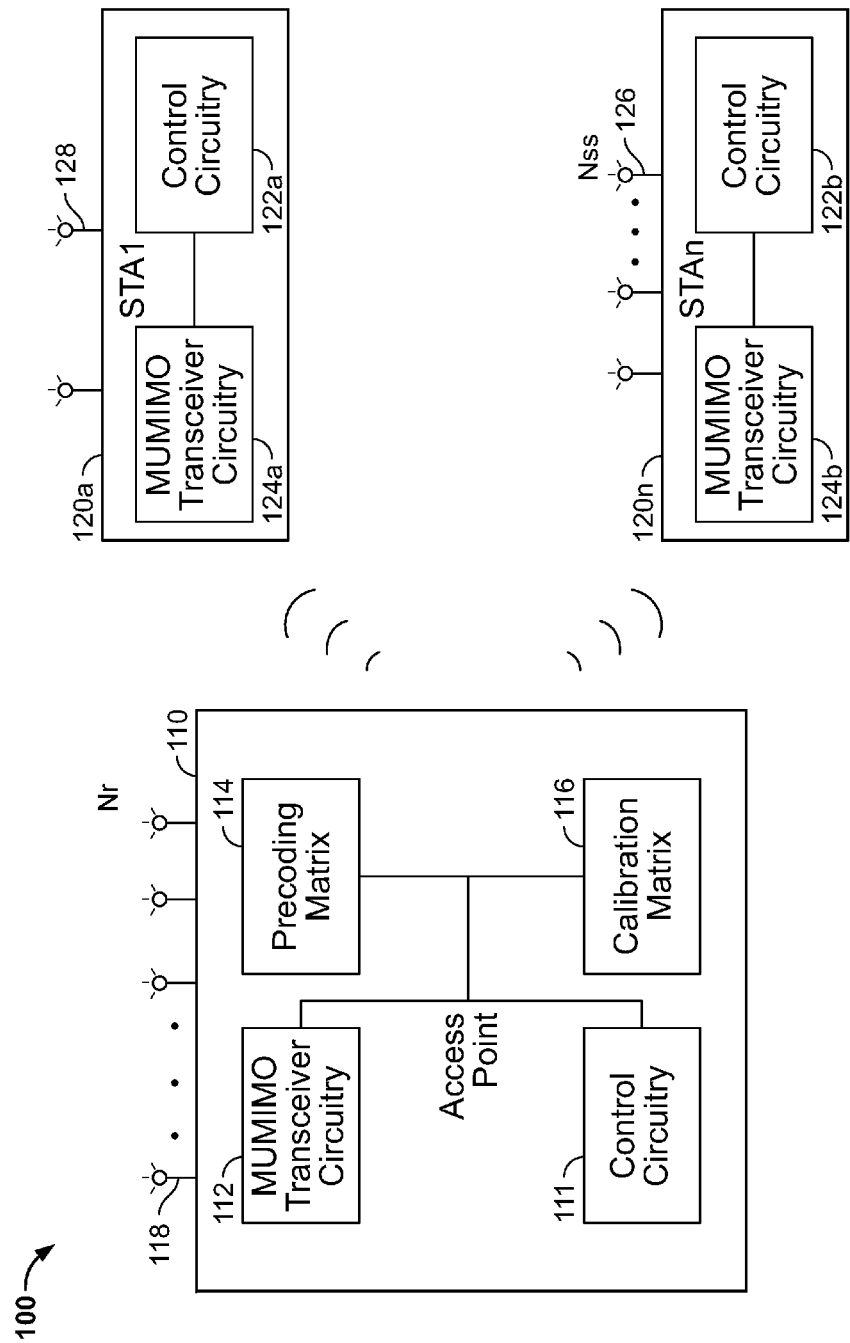
FIG. 1 shows an example of a MUMIMO system in accordance with various embodiments.

FIG. 1 shows an example of a MUMIMO system 100 in accordance with various embodiments of the disclosure. MUMIMO system 100 includes an access point 110 and multiple receiving stations 120a-n. Access point 110 includes Nr number of antennas 118 (e.g., 8 antennas), control circuitry 111, and MUMIMO transceiver circuitry 112. Any operation discussed in this disclosure with respect to access point 110 may be performed in whole or in part by control circuitry 111. In particular, control circuitry 111 may be configured by being programmed through a set of instructions to perform the operations of access point 110 and may instruct other components of access point 110 (e.g., MUMIMO transceiver circuitry 112, precoding matrix 114, and calibration matrix 116) to perform the operations discussed in this disclosure. Receiving stations 120a-n include respective MUMIMO transceiver circuitries 124a-b and control circuitries 122a-b. Any operation discussed in this disclosure with respect to receiving stations 120a-n may be performed in whole or in part by control circuitries 122a-b. In particular, control circuitries 122a-b may be configured by being programmed through a set of instructions to perform the operations of receiving stations 120a-n and may instruct other components of receiving stations 120a-n (e.g., MUMIMO transceiver circuitries 124a-b) to perform the operations discussed in this disclosure Access point 110 communicates simultaneously with each of receiving stations 120a-n through a downlink channel using DL-MUMIMO packets according to the 802.11ac/ax protocol. Each receiving station 120a-n communicates with access point 110 through an uplink channel using UL-MUMIMO packets according to the 802.11ac/ax protocol.

In some embodiments, the access point 110 may have Nr number of antennas 118 (e.g., 4 antennas). A receiving station 120a or 120n may include Nss number of antennas 126 or 128 (e.g., 2 antennas) which is usually less than Nr number of antennas 118 of the access point. In this way, when the access point transmits an NDP from the Nr number of antennas 118, the channel matrix is of the size Nr×Nss, e.g., 4×2. In such circumstances, access point 110 may conduct implicit sounding to obtain the channel state information from stations 120*a-n* in the uplink for generating a precoding matrix for use in transmitting downlink data using Nr number of antennas 118 of access point 110. For example, receiving station 120*a* may transmit a first data packet using Nss number of antennas 128 through an uplink communications path. Control circuitry 111 may compute a first channel estimate from the first data packet access point 110 receives in the uplink communications path from receiving station 120*a*. The first channel estimate may be computed based on every antenna 118 of access point 110 and may represent an uplink communications channel estimate between every antenna 118 of access point 110 and antennas 128 of receiving station 120*a* used to transmit the first data packet. Receiving station 120*n* may transmit a second data packet using Nss number of antennas 126 through an uplink communications path. Control circuitry 111 may compute a second channel estimate from the second data packet access point 110 receives in the uplink communications path from receiving station 120*n*. The second channel estimate may be computed based on every antenna 118 of access point 110 and may represent an uplink communications channel estimate between every antenna 118 of access point 110 and antennas 126 of receiving station 120*n* used to transmit the second data packet. Control circuitry 111 may combine the first and second channel estimates to determine the uplink channel estimate between access point 110 and every receiving station in communication with access point 110.

In some circumstances, the uplink communications channel is reciprocal with the downlink communications channel. In such circumstances, control circuitry 111 may determine the precoding matrix for downlink communications by computing a matrix transpose of the combined first and second uplink channel estimates. Control circuitry 111 may store the precoding matrix in precoding matrix storage device 114 and may instruct MUMIMO transceiver circuitry 112 to transmit data to receiving stations 120*a-n* using the precoding matrix stored in storage device 114.

In some circumstances, the uplink communications channel may not be reciprocal with the downlink communications channel. In such circumstances, control circuitry 111 may use a calibration matrix generate the precoding matrix to compensate for differences in the uplink and downlink channels.

In some embodiments, access point 110 may first calibrate the downlink channel estimate, determined based on the uplink channel estimates derived from data packets sent by stations 120*a-n*, using the calibration matrix and then compute the precoding matrix based on the calibrated downlink channel estimate. For example, control circuitry 111 may first combine the first and second channel estimates. Control circuitry 111 may then transpose the combined first and second channel estimates to generate transposed combined first and second channel estimates. Control circuitry 111 may then retrieve a calibration matrix from calibration matrix storage device 116 and apply the calibration matrix to the transposed combined first and second channel estimates to compute a calibrated downlink channel estimate. Control circuitry 111 may then compute a precoding matrix for storage in storage device 114 based on the calibrated downlink channel estimate.

In particular, in such implementations, the precoding matrix may be computed in accordance with the following sequence:

1) compute Uplink Channel State Information (CSIs) $[H_{UL\_i}]_{Nr \times Nss\_UL\_i}$
2) Transpose computed Uplink CSIs to Downlink CSIs $[H_{DL\_i}]_{Nss\_UL\_i \times Nr}$
3) Apply Calibration Correction Matrix on each Downlink CSI matrix $C_{cal} [H_{DL\_i}]_{Nss\_UL\_i \times Nr}$
4) Compute Precoding Matrix based on calibrated Downlink CSI matrix $[Q_{DL}]_{Nr \times Nss\_DL\_Total}$ where Nr represents the number of available antennas at the access point, Nss represents the number of available streams at a given station i, and $C_{cal}$ is the calibration matrix.

In some embodiments, access point 110 may first compute a precoding matrix based on the downlink channel estimate, determined based on the uplink channel estimates derived from data packets sent by stations 120*a-n*, and then modify the precoding matrix with the calibration matrix to transmit data to stations 120*a-n* through the downlink channel. For example, control circuitry 111 may first combine the first and second channel estimates. Control circuitry 111 may then transpose the first and second channel estimates to compute a non-calibrated downlink channel estimate. Control circuitry 111 may then compute the precoding matrix based on the non-calibrated downlink channel estimate. Control circuitry 111 may then retrieve a calibration matrix from calibration matrix storage device 116 and apply the calibration matrix to the precoding matrix to modify the precoding matrix and store the modified precoding matrix in storage device 114.

In particular, in such implementations, the precoding matrix may be computed in accordance with the following sequence:

1) compute Uplink Channel State Information (CSIs) $[H_{UL\_i}]_{Nr \times Nss\_UL\_i}$
2) Transpose computed Uplink CSIs to Downlink CSIs $[H_{DL\_i}]_{Nss\_UL\_i \times Nr}$
3) Compute Precoding Matrix based on Downlink CSIs $[Q_{DL}]_{Nr \times Nss\_DL\_Total}$
4) Apply Calibration Correction Matrix to the Precoding Matrix $C_{cal} [Q_{DL}]_{Nr \times Nss\_DL\_Total}$ where Nr represents the number of available antennas at the access point, Nss represents the number of available streams at a given station i, and $C_{cal}$ is the calibration matrix.

In some embodiments, the first and second data packets, used by access point 110 to derive the first and second channel estimates that represent the uplink communications channel between access point 110 and receiving stations 120*a-n*, may be any regular data packet receiving stations 120*a-n* transmit during normal traffic. For example, the first and second data packets may be any combination of a block acknowledge (BA), acknowledge (ACK), TCP ACKs, and/or a sounding packet. In some circumstances, access point 110 may transmit data packets to receiving stations 120*a-n* to cause receiving stations 120*a-n* to transmit the first and second data packets.

In some embodiments, access point 110 may compute the first and second channel estimates based on a preamble, postamble, or any other predetermined sequence in respective data frames transmitted by stations 120*a-c*. For example, station 120*a* may transmit a data packet that includes a preamble, postamble, or any other predetermined sequence to access point 110. Station 120*a* may transmit the data packet in two streams using antennas 128 (e.g., two antennas). Access point 110 may compute a first channel estimate based on the preamble, postamble, or any other predetermined sequence in the data packet transmitted by station 120*a*. The first channel estimate may be computed based on each of antennas 118 of access point 110 even though station 120*a* used a number of antennas less than the total number of antennas of access point 110 to transmit the data packet. In particular, access point 110 may compute a first channel estimate having a size Nr×Nss, where Nr is the total number of antennas 118 of access point 110 and Nss is the total number of antennas 128 of station 120*a*. For example, the first channel estimate may have a size of 8×2. In some implementations, access point 110 may compute the first channel estimate by measuring a phase and gain of the preamble, postamble, or any other predetermined sequence across all subcarriers of each antenna 118. Access point 110 may then transpose the first channel estimate to generate a matrix that has a size of Nss×Nr, where Nr is the total number of antennas 118 of access point 110 and Nss is the total number of antennas 128 of station 120*a*. For example, the transposed first channel estimate may have a size of 2×8.

In some implementations, station 120*n* may transmit a data packet that includes a preamble, postamble, or any other predetermined sequence to access point 110. Station 120*n* may transmit the data packet in four streams using antennas 126 (e.g., four antennas). Access point 110 may compute a second channel estimate based on the preamble, postamble, or any other predetermined sequence in the data packet transmitted by station 120*n*. The second channel estimate may be computed based on each of antennas 118 of access point 110 even though station 120*n* used a number of antennas less than the total number of antennas of access point 110 to transmit the data packet. In particular, access point 110 may compute a second channel estimate having a size Nr×Nss, where Nr is the total number of antennas 118 of access point 110 and Nss is the total number of antennas 126 of station 120*n*. For example, the second channel estimate may have a size of 8×4. In some implementations, access point 110 may compute the second channel estimate by measuring a phase and gain of the preamble, postamble, or any other predetermined sequence across all subcarriers of each antenna 118. Access point 110 may then transpose the second channel estimate to generate a matrix that has a size of Nss×Nr, where Nr is the total number of antennas 118 of access point 110 and Nss is the total number of antennas 126 of station 120*n*. For example, the transposed first channel estimate may have a size of 4×8.

Access point 110 may then combine the first and second transposed channel estimates. Access point 110 may then retrieve and apply the calibration matrix directly to the transposed channel estimates and then compute a precoding matrix or access point 110 may compute the precoding matrix from the transposed channel estimates and apply the calibration matrix to the precoding matrix. For example access point 110 may adjust the phase and/or gain in the transposed channel estimates by the phase and/or gain specified in the calibration matrix for the respective antenna or subcarrier. Alternatively, access point 110 may adjust the phase and/or gain in the precoding matrix by the phase and/or gain specified in the calibration matrix for the respective antenna or subcarrier.

In some embodiments, access point 110 may compute the precoding matrix representing the downlink channel based on channel estimates of the uplink data transmissions periodically. For example, access point 110 may compute the precoding matrix or adjust the previously stored precoding matrix every time a frame of data is received from one of stations 120*a-n*. In some implementations, access point 110 may compute the precoding matrix when a new receiving station is detected. In some implementations, access point 110 may compute the precoding matrix once during an initial startup phase.

In some embodiments, access point 110 may compute the precoding matrix using a combination of explicit sounding and implicit sounding. For example, access point 110 may transmit a signal to stations 120*a-n* instructing the stations to transmit respective feedback matrices. These matrices represent channel estimates between access point 110 may each respective station 120*a-n*. For example, station 120*a* may transmit a feedback frame with a feedback matrix based on signals transmitted to station 120*a* from access point 110 using antennas 128. Access point 110 may use a preamble, postamble, or any other predetermined sequence of the feedback frame to determine the channel estimates for the remaining antennas 118 that were not used in communicating with station 120*a*. Access point 110 may then combine the determined channel estimates for the remaining antennas with the channel estimate determined from the feedback matrix received from station 120*a* to determine the first channel estimate. The second channel estimate may be computed in a similar manner based on explicit sounding information (a feedback frame) received from station 120*n*.

In some embodiments, the calibration matrix stored in calibration matrix storage device 116 may be predetermined and hard coded during manufacturing and/or may be computed during a calibration procedure of access point 110. In some implementations, a calibration procedure may include the access point 110 communicating with a given wireless device to obtain a channel estimate of the uplink channel and the downlink channel. For example, access point 110 may transmit a signal to the wireless device using a first of antennas 118. The wireless device may compute a channel estimate of the received signal and feed back to access point 110 the channel estimate. Access point 110 may then transmit the signal using a second of antennas 118. The wireless device may compute a channel estimate of the received signal and feed back to access point 110 the channel estimate. This procedure may be repeated for all of antennas 118 of access point 110. Once the channel estimate is received for each of antennas 118 of access point 110, access point 110 may compute a difference in phase and/or magnitude for each pair of transmission and receiving paths. For example, access point 110 may compute a difference in phase and/or magnitude for a first path that includes a first antenna of access point 118 to a first antenna 128 of receiving station 120*a* and a second path that includes a second antenna of access point 118 to a first antenna 128 of receiving station 120*a*. Access point 110 may then repeat this computation of phase and/or magnitude for each combination of transmit and receive path between access point 110 and the wireless receiver device. Access point 110 may generate a matrix that represents these difference in phase and/or magnitude and store this matrix as the calibration matrix in storage 116.

The calibration matrix may be constant across all subcarriers and/or may be different for each subcarrier of access point 110.

Figure 2:
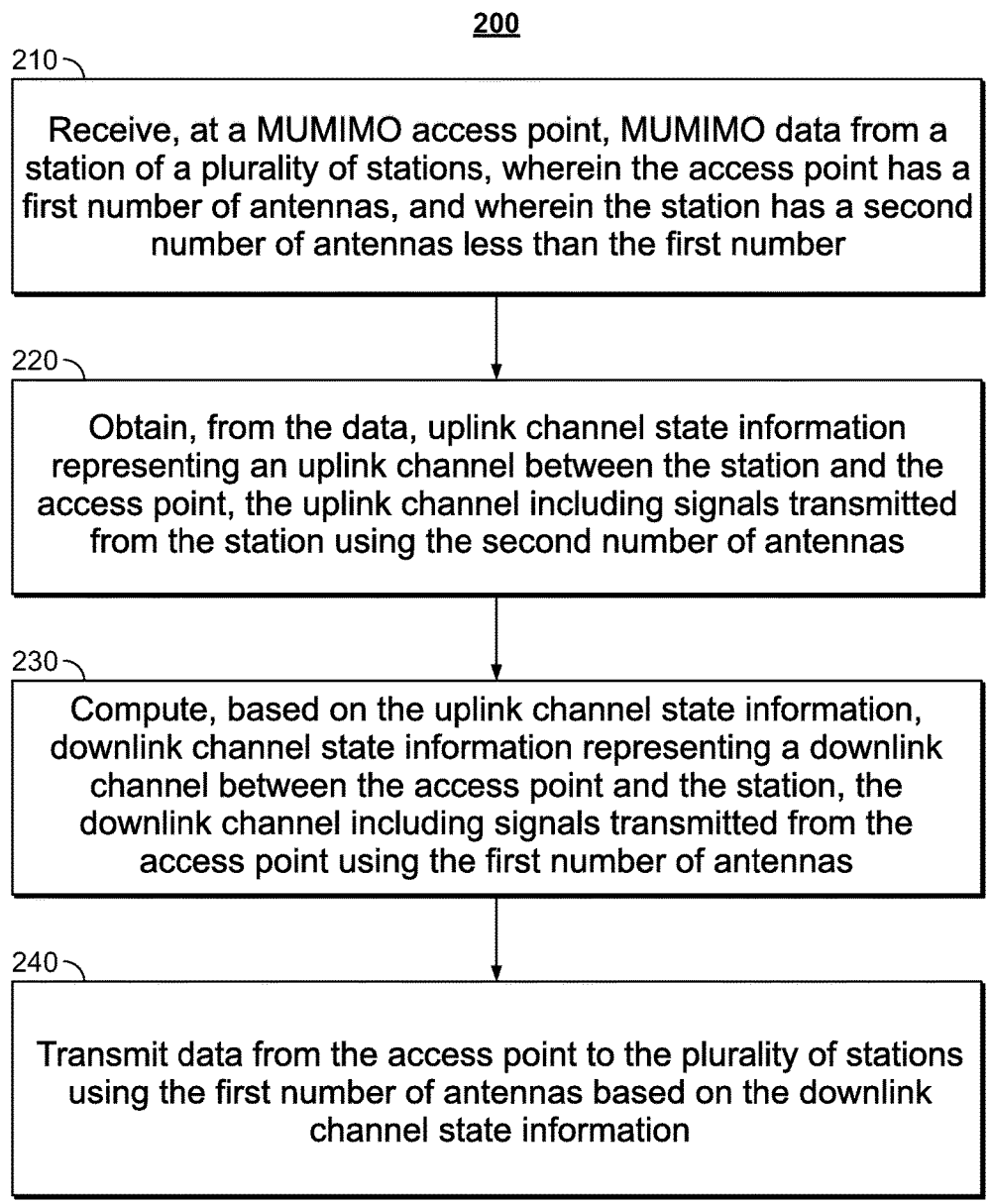
FIG. 2 shows an exemplary flowchart of a process for performing implicit sounding in MUMIMO systems in accordance with various embodiments.

FIG. 2 shows an exemplary flowchart of a process 200 for performing implicit sounding in MUMIMO systems in accordance with various embodiments. At 210, MUMIMO data is received, at a MUMIMO access point, from a station of a plurality of stations, wherein the access point has a first number of antennas, and wherein the station has a second number of antennas lower than the first number.

At 220, uplink channel state information representing an uplink channel between the station and the access point is obtained, from the data, the uplink channel including signals transmitted from the station using the second number of antennas.

At 230, downlink channel state information representing a downlink channel between the access point and the station is computed based on the uplink channel state information, the downlink channel including signals transmitted from the access point using the first number of antennas.

At 240, data is transmitted from the access point to the plurality of stations using the first number of antennas based on the downlink channel state information.

Various embodiments discussed in conjunction with FIG. 1 are performed by various electronic components of one or more electronic circuits, such as but not limited to an integrated circuit, application-specific integrated circuit (ASIC), DSP, and/or the like. Various components discussed throughout this disclosure such as, but not limited to network devices (e.g., devices in FIG. 1), and/or the like, are configured to include a set of electronic circuit components, and communicatively operate on one or more electronic circuits. Each electronic circuit is configured to include any of, but not limited to logic gates, memory cells, amplifiers, filters, and/or the like. Various embodiments and components disclosed herein are configured to be at least partially operated and/or implemented by processor-executable instructions stored on one or more transitory or non-transitory processor-readable media.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed to achieve the desirable results.

The subject matter of this specification has been described in terms of particular aspects, but other aspects can be implemented and are within the scope of the following claims. For example, the actions recited in the claims can be performed in a different order and still achieve desirable results. As one example, the process depicted in FIG. 10 does not necessarily require the particular order shown, or sequential order, to achieve desirable results. In certain implementations, multitasking and parallel processing may be advantageous. Other variations are within the scope of the following claims.

What is claimed is:

1. A method for performing beamforming in a multiple-user-multiple-input-multiple-output (MUMIMO) system, the method comprising:
   receiving, at a MUMIMO access point, MUMIMO data from a station of a plurality of stations, wherein the access point has a first number of antennas, and wherein the station has a second number of antennas less than the first number;
   obtaining, from the MUMIMO data, uplink channel state information representing an uplink channel between the station and the MUMIMO access point, the uplink channel including signals transmitted from the station using the second number of antennas;
   computing, based on the uplink channel state information, downlink channel state information representing a downlink channel between the MUMIMO access point and the station, the downlink channel including signals transmitted from the MUMIMO access point using the first number of antennas; and
   transmitting data from the MUMIMO access point to the plurality of stations using the first number of antennas based on the downlink channel state information.

2. The method of claim 1 further comprising:
   computing, based on the uplink channel state information, an uplink channel state information matrix having a size corresponding to the first number of antennas of the access point;
   generating a downlink channel state information matrix by transposing the uplink channel state information matrix; and
   computing, based on the downlink channel state information matrix, a precoding matrix at the access point for transmitting the data to the plurality of stations.

3. The method of claim 2, wherein the station is a first station and wherein the downlink channel state information matrix is a first downlink channel state information matrix, and the method further comprising:
   receiving, at the MUMIMO access point, MUMIMO data from a second station of a plurality of stations, wherein the second station has a third number of antennas less than the second number;
   computing, based on uplink channel state information of the data received from the second station, a second uplink channel state information matrix having a size corresponding to the first number of antennas of the access point; and
   generating a second downlink channel state information matrix by transposing the second uplink channel state information matrix;
   wherein computing the precoding matrix at the access point comprises combining the first and second downlink channel state information matrices.

4. The method of claim 2, wherein the size of the uplink channel state information matrix is Nr×Nss, and wherein the size of the downlink channel state information matrix is Nss×Nr, where Nr is the first number and Nss is the second number.

5. The method of claim 2 further comprising:
   retrieving a calibration correction matrix from storage; and
   applying the calibration correction matrix to the downlink channel state information matrix before computing the precoding matrix.

6. The method of claim 2 further comprising:
   retrieving a calibration correction matrix from storage; and
   applying the calibration correction matrix to the precoding matrix.

7. The method of claim 1, wherein obtaining the uplink channel state information comprises processing a predetermined symbol of the data received by each of the antennas of the access point to generate the uplink channel state information corresponding to each of the antennas of the access point.

8. The method of claim 1 further comprising:
   transmitting from the access point to the plurality of stations at least one of a null data packet, a junk data packet, and a Transmission Control Protocol (TCP) null data packet; and
   causing the station to transmit at least one of Block Acknowledgement (BA/ACK) frame and a transmission control protocol (TCP) acknowledgements (ACKs) frame in response to the station receiving the at least one of the null data packet, the junk data packet, and the TCP null data packet, wherein the downlink channel state information is computed periodically.

9. The method of claim 1 further comprising:
communicating information between the MUMIMO access point and another wireless device;
obtaining a raw channel state information estimate of a downlink channel and an uplink channel of at least one of the MUMIMO access point antennas used in communicating the information;
computing at least one of a phase and magnitude difference between the downlink and uplink channels; and
generating a calibration matrix based on the computed at least one of a phase and magnitude difference.

10. The method of claim 7, wherein the calibration matrix is either constant across all subcarriers of the MUMIMO access point or different for each subcarrier of the access point.

11. A system for performing beamforming in a multiple-user-multiple-input-multiple-output (MUMIMO) system, the system comprising:
control circuitry configured to:
receive, at a MUMIMO MUMIMO access point, MUMIMO data from a station of a plurality of stations, wherein the MUMIMO access point has a first number of antennas, and wherein the station has a second number of antennas less than the first number;
obtain, from the data, uplink channel state information representing an uplink channel between the station and the MUMIMO access point, the uplink channel including signals transmitted from the station using the second number of antennas;
compute, based on the uplink channel state information, downlink channel state information representing a downlink channel between the MUMIMO access point and the station, the downlink channel including signals transmitted from the MUMIMO access point using the first number of antennas; and
transmit data from the MUMIMO access point to the plurality of stations using the first number of antennas based on the downlink channel state information.

12. The system of claim 11, wherein the control circuitry is further configured to:
compute, based on the uplink channel state information, an uplink channel state information matrix having a size corresponding to the first number of antennas of the MUMIMO access point;
generate a downlink channel state information matrix by transposing the uplink channel state information matrix; and
compute, based on the downlink channel state information matrix, a precoding matrix at the MUMIMO access point for transmitting the data to the plurality of stations.

13. The system of claim 12, wherein the station is a first station and wherein the downlink channel state information matrix is a first downlink channel state information matrix, and wherein the control circuitry is further configured to:
receive, at the MUMIMO MUMIMO access point, MUMIMO data from a second station of a plurality of stations, wherein the second station has a third number of antennas less than the second number;
compute, based on uplink channel state information of the data received from the second station, a second uplink channel state information matrix having a size corresponding to the first number of antennas of the MUMIMO access point; and
generate a second downlink channel state information matrix by transposing the second uplink channel state information matrix;
wherein the control circuitry is further configured to compute the precoding matrix at the MUMIMO access point by combining the first and second downlink channel state information matrices.

14. The system of claim 12, wherein the size of the uplink channel state information matrix is Nr×Nss, and wherein the size of the downlink channel state information matrix is Nss×Nr, where Nr is the first number and Nss is the second number.

15. The system of claim 12, wherein the control circuitry is further configured to:
retrieve a calibration correction matrix from storage; and
apply the calibration correction matrix to the downlink channel state information matrix before computing the precoding matrix.

16. The system of claim 12, wherein the control circuitry is further configured to:
retrieve a calibration correction matrix from storage; and
apply the calibration correction matrix to the precoding matrix.

17. The system of claim 11, wherein the control circuitry is configured to obtain the uplink channel state information by processing a predetermined symbol of the data received by each of the antennas of the MUMIMO access point to generate the uplink channel state information corresponding to each of the antennas of the MUMIMO access point.

18. The system of claim 11, wherein the control circuitry is further configured to:
transmit from the MUMIMO access point to the plurality of stations at least one of a null data packet, a junk data packet, and a TCP null data packet; and
cause the station to transmit as the data at least one of block acknowledgement (BA/ACK) frame and a transfer control protocol (TCP) acknowledgement (ACKs) frame in response to the station receiving the at least one of the null data packet, the junk data packet, and the TCP null data packet, wherein the downlink channel state information is computed periodically.

19. The system of claim 11, wherein the control circuitry is further configured to:
communicate information between the MUMIMO access point and another wireless device;
obtain a raw channel state information estimate of a downlink channel and an uplink channel of at least one of the MUMIMO access point antennas used in communicating the information;
compute at least one of a phase and magnitude difference between the downlink and uplink channels; and
generate a calibration matrix based on the computed at least one of a phase and magnitude difference.

20. The system of claim 17, wherein the calibration matrix is either constant across all subcarriers of the MUMIMO access point or different for each subcarrier of the MUMIMO access point.

* * * * *